United States Patent
Greenfield

(10) Patent No.: US 10,328,654 B2
(45) Date of Patent: Jun. 25, 2019

(54) SYSTEM AND METHOD FOR PRODUCING A MULTI-LAYERED BOARD HAVING A MEDIUM WITH IMPROVED STRUCTURE

(71) Applicant: Scorrboard, LLC, Renton, WA (US)

(72) Inventor: Giles Greenfield, Renton, WA (US)

(73) Assignee: Scorrboard, LLC, Renton, WA (US)

( * ) Notice: Subject to any disclaimer, the term of this patent is extended or adjusted under 35 U.S.C. 154(b) by 114 days.

(21) Appl. No.: 15/134,106

(22) Filed: Apr. 20, 2016

(65) Prior Publication Data

US 2017/0305098 A1    Oct. 26, 2017

(51) Int. Cl.
 B31F 1/28 (2006.01)
 B32B 3/28 (2006.01)

(52) U.S. Cl.
 CPC ............ *B31F 1/2818* (2013.01); *B31F 1/289* (2013.01); *B31F 1/2813* (2013.01); *B31F 1/2895* (2013.01); *B32B 3/28* (2013.01); *Y10T 428/24694* (2015.01); *Y10T 428/24702* (2015.01); *Y10T 428/24711* (2015.01)

(58) Field of Classification Search
 CPC .............. B31F 1/32; Y10T 428/24694; Y10T 428/24702; Y10T 428/24711; B32B 3/28
 See application file for complete search history.

(56) References Cited

U.S. PATENT DOCUMENTS

| | | |
|---|---|---|
| 762,033 A | 6/1904 | Ferres |
| 1,504,218 A | 8/1924 | Crowell |
| 1,582,841 A | 4/1926 | Lorenz |
| 1,863,973 A | 6/1932 | Ellis, Jr. |
| 2,054,867 A | 9/1936 | Rudin et al. |
| RE20,970 E | 1/1939 | Rowe et al. |
| 2,359,314 A | 10/1944 | Klein et al. |
| 2,474,381 A | 6/1949 | Bergstein |
| 2,485,020 A | 10/1949 | Staude |
| 2,503,874 A | 4/1950 | Ives |
| 2,651,448 A | 8/1950 | Dusseault |

(Continued)

FOREIGN PATENT DOCUMENTS

| | | |
|---|---|---|
| AU | 2014232272 | 10/2015 |
| AU | 2014265869 | 10/2015 |

(Continued)

OTHER PUBLICATIONS

Machine translation of cited reference FR 2594160.*

(Continued)

*Primary Examiner* — Donald J Loney
(74) *Attorney, Agent, or Firm* — FisherBroyles LLP; Kevin D. Jablonski

(57) ABSTRACT

A system and method for producing a board product made from paper products that have embossed medium that features an improved structural profile. The improved structural profile may include a triangular flute pattern wherein each flute may exhibit a first linear leg support and a second linear leg support that each support a center apex structure. The apex may have a substantially flat portion that is configured to engage a facing. As such, the board product may further include one or more facings that are adhesively coupled to the embossed medium. Further, the apex of each "triangle" may also have a groove or channel for receiving an adhesive in a continuous and uniform manner.

8 Claims, 3 Drawing Sheets

(56) References Cited

U.S. PATENT DOCUMENTS

| | | | |
|---|---|---|---|
| 2,547,880 A | 4/1951 | Meyer et al. | |
| 2,960,145 A | 11/1960 | Ruegenberg | |
| 3,002,876 A | 10/1961 | Rosati | |
| 3,039,372 A | 6/1962 | La Bombard | |
| 3,122,300 A | 2/1964 | La Bombard | |
| 3,156,599 A | 11/1964 | Keesee | |
| 3,178,494 A | 4/1965 | Tisdale | |
| 3,290,205 A | 12/1966 | Goldstein et al. | |
| 3,449,157 A | 6/1969 | Wandel | |
| 3,526,566 A | 9/1970 | McIlvain, Jr. et al. | |
| 3,529,516 A | 9/1970 | Dorsey et al. | |
| 3,542,636 A | 11/1970 | Wandel | |
| 3,735,674 A | 5/1973 | Haddock | |
| 3,773,587 A | 11/1973 | Flewwelling | |
| 4,034,135 A | 7/1977 | Passmore et al. | |
| 4,126,508 A | 11/1978 | Hoelzinger | |
| 4,179,253 A | 12/1979 | Lightfoot | |
| 4,268,555 A | 5/1981 | Kantz | |
| 4,285,764 A | 8/1981 | Salvai | |
| 4,437,850 A | 3/1984 | Ono | |
| 4,541,895 A | 9/1985 | Albert | |
| 4,544,597 A | 10/1985 | Peer, Jr. et al. | |
| 4,618,391 A | 10/1986 | Torti et al. | |
| 4,657,611 A | 4/1987 | Guins | |
| 4,693,413 A | 9/1987 | McFarland et al. | |
| 4,748,067 A * | 5/1988 | Cline | B32B 3/28 428/186 |
| 4,800,286 A | 1/1989 | Brears | |
| 4,800,826 A | 1/1989 | Shiskin | |
| 4,886,563 A * | 12/1989 | Bennett | B31F 1/2813 156/205 |
| 4,931,346 A | 6/1990 | Nogueras Dardina | |
| 4,935,082 A | 6/1990 | Bennett et al. | |
| 5,356,364 A | 10/1994 | Veith et al. | |
| 5,419,796 A | 5/1995 | Miller | |
| 5,508,083 A | 4/1996 | Chapman, Jr. | |
| 5,581,353 A | 12/1996 | Taylor | |
| 5,582,571 A | 12/1996 | Simpson et al. | |
| 5,589,257 A | 12/1996 | Carriker et al. | |
| 5,630,903 A | 5/1997 | Knorr et al. | |
| 5,687,517 A | 11/1997 | Wiercinski et al. | |
| 5,690,601 A | 11/1997 | Cummings et al. | |
| 5,733,403 A | 3/1998 | Morley | |
| 5,799,861 A | 9/1998 | Bonner et al. | |
| 5,857,395 A | 1/1999 | Bohm et al. | |
| 6,056,840 A | 5/2000 | Mills et al. | |
| 6,139,938 A | 10/2000 | Lingle et al. | |
| 6,153,037 A | 11/2000 | Kim et al. | |
| 6,162,155 A | 12/2000 | Gordon et al. | |
| 6,508,751 B1 | 1/2003 | Weishew et al. | |
| 6,871,480 B1 * | 3/2005 | Goodrich | B31D 3/005 156/207 |
| 7,413,629 B2 | 8/2008 | Fisher et al. | |
| 7,909,954 B2 | 3/2011 | Johnston | |
| 7,963,899 B2 | 6/2011 | Papsdorf et al. | |
| 8,012,309 B2 | 9/2011 | Pare et al. | |
| 8,771,579 B2 | 7/2014 | Kohler | |
| 2001/0001410 A1 | 5/2001 | Ishibuchi et al. | |
| 2003/0137667 A1 | 7/2003 | Reis et al. | |
| 2004/0076798 A1 | 4/2004 | Larsson et al. | |
| 2004/0089412 A1 | 5/2004 | Topolkaraev | |
| 2004/0159693 A1 | 8/2004 | Adachi | |
| 2004/0224828 A1 | 11/2004 | Nelles | |
| 2006/0151655 A1 | 7/2006 | Johnston | |
| 2007/0098887 A1 | 5/2007 | Kohler | |
| 2008/0300825 A1 | 12/2008 | Ishibuchi et al. | |
| 2009/0029840 A1 | 1/2009 | Chen | |
| 2010/0331160 A1 | 12/2010 | Kohler | |
| 2011/0014433 A1 | 1/2011 | Trani et al. | |
| 2011/0114712 A1 | 5/2011 | Malo et al. | |
| 2011/0226847 A1 | 9/2011 | Nakano | |
| 2012/0205429 A1 | 8/2012 | Trani et al. | |
| 2012/0226250 A1 | 9/2012 | Sato et al. | |
| 2014/0141113 A1 | 5/2014 | Kohler | |
| 2014/0166520 A1 | 6/2014 | Hoppe et al. | |
| 2015/0010734 A1 | 1/2015 | Van berlo | |
| 2015/0114249 A1 | 4/2015 | Comorre | |
| 2015/0307755 A1 | 10/2015 | Krumm et al. | |
| 2016/0167338 A1 | 6/2016 | Greenfield | |
| 2016/0271897 A1 | 9/2016 | Greenfield | |
| 2017/0157894 A9 | 6/2017 | Greenfield | |
| 2017/0305103 A1 | 10/2017 | Greenfield | |
| 2017/0341331 A1 | 11/2017 | Greenfield | |

FOREIGN PATENT DOCUMENTS

| | | | |
|---|---|---|---|
| CA | 2907431 | 9/2014 | |
| CA | 2907392 | 11/2014 | |
| CN | 1126457 | 7/1996 | |
| CN | 2841324 | 11/2006 | |
| CN | 101952120 | 1/2011 | |
| CN | 105121147 | 12/2015 | |
| CN | 105121148 | 12/2015 | |
| EP | 2969522 | 1/2016 | |
| EP | 2969526 | 1/2016 | |
| FR | 2550724 | 2/1985 | |
| FR | 2596033 A1 | 3/1986 | |
| FR | 2594160 A3 * | 8/1987 | ............. E04B 7/205 |
| GB | 594328 A | 11/1947 | |
| GB | 977069 A | 12/1961 | |
| GB | 2301316 A | 5/1995 | |
| GB | 2368074 A | 4/2002 | |
| HK | 1212298 | 6/2016 | |
| HK | 1212302 | 6/2016 | |
| JP | 02-235623 A | 9/1990 | |
| JP | 03-275292 A | 12/1991 | |
| JP | 1996-309889 A | 11/1996 | |
| JP | 2007152689 A | 6/2007 | |
| JP | 2011/079207 A | 4/2011 | |
| JP | 2011079207 A | 4/2011 | |
| JP | 2016-519008 | 6/2016 | |
| JP | 2016515959 | 6/2016 | |
| KR | 2000-0058870 | 10/2000 | |
| KR | 2000/0058870 A | 10/2000 | |
| KR | 1008/66390 B1 | 11/2008 | |
| KR | 100866390 B1 | 11/2008 | |
| KR | 20160008170 | 1/2016 | |
| KR | 20160008518 | 1/2016 | |
| PH | 12015502380 | 2/2016 | |
| PH | 12015502381 | 2/2016 | |
| WO | WO 95/35204 A1 | 12/1995 | |
| WO | 98/18614 | 5/1998 | |
| WO | 1999047347 | 9/1999 | |
| WO | 2009/101526 A1 | 8/2009 | |
| WO | 2012128604 | 9/2012 | |
| WO | WO 2013/098353 A1 | 7/2013 | |
| WO | 2014146036 | 9/2014 | |
| WO | 2014186043 | 11/2014 | |
| WO | WO 2015/128546 A1 | 9/2015 | |

OTHER PUBLICATIONS

Supplementary European Search Report for European application No. EP14762807, European Patent Office, The Hague, dated Jun. 21, 2016, pp. 5.

First Office Action and Search Report along with English Translation for Chinese Application No. 201480016009X, dated Aug. 3, 2016, pp. 17.

International Search Report & Written Opinion dated Jun. 15, 2017; PCT Appl. No. US17/23611 filed Mar. 22, 2017.

International Search Report & WrittenOpinion dated Jun. 27, 2017; PCT Appl. No. US17/25510; filed Mar. 31, 2017.

International Search Report & Written Opinion dated Jun. 30, 2017; PCT Appl. No. US17/027624; filed Apr. 14, 2017.

Internation Search Report & Written Opinion, dated Jul. 21, 2017; PCT/US2017/025531, filed Mar. 31, 2017.

International Search Report and Written Opinion dated Jul. 6, 2017; PCT Appl. US2017/25491, filed Mar. 31, 2017.

First Examination Report for New Zealand Patent Application Serial No. 712616, New Zealand Intellectual Property Office, dated Nov. 30, 2015, pp. 2.

(56) References Cited

OTHER PUBLICATIONS

First Examination Report for New Zealand Patent Application Serial No. 712611, New Zealand Intellectual Property Office, Nov. 30, 2015, pp. 2.
International Search Report based on PCT/US2014/030916; dated Aug. 22, 2014, pp. 3.
International Search Report based on PCT/US2014/030909; dated Aug. 20, 2014, pp. 3.
First Patent Examination Report for Australian Patent Application Serial No. 2014232272, Australian Government, IP Australia, Mar. 3, 2016, pp. 3.
First Patent Examination Report for Australian Patent Application Serial No. 2014265869, Australian Government, IP Australia, Apr. 21, 2016, pp. 2.
Second Examination Report for New Zealand Patent Application Serial No. 712611, New Zealand Intellectual Property Office, Jul. 6, 2016, pp. 3.
U.S. Appl. No. 15/077,250, entitled System and Method for Inducing Fluting in a Paper Product by Embossing With Respect to Machine Direction, filed Mar. 22, 2016; 21 pages.
U.S. Appl. No. 15/088,999, entitled System and Method for Producing Multi-Layered Board Having a Corrugated Medium and an Embossed Medium, filed Apr. 1, 2016; 22 pages.
WO dated Aug. 20, 2009 for PCT/IB2009/000271 filed Feb. 13, 2009.
European Extended Search Report; European Patent Organization; EP 14797031.3; dated Oct. 31, 2016; pp. 1-8.

* cited by examiner

SYSTEM AND METHOD FOR PRODUCING A MULTI-LAYERED BOARD HAVING A MEDIUM WITH IMPROVED STRUCTURE

CROSS-RELATED APPLICATIONS

This application is related to U.S. patent application Ser. No. 15/077,250, entitled SYSTEM AND METHOD FOR INDUCING FLUTING IN A PAPER PRODUCT BY EMBOSSING WITH RESPECT TO MACHINE DIRECTION, filed 22 Mar. 2016, and is related to U.S. patent application Ser. No. 15/088,999, entitled SYSTEM AND METHOD FOR PRODUCING MULTI-LAYERED BOARD HAVING A CORRUGATED MEDIUM AND AN EMBOSSED MEDIUM, filed 1 Apr. 2016, further, the present application is also related to U.S. patent application Ser. No. 15/134,153, entitled SYSTEM AND METHOD FOR PRODUCING A FACING FOR A BOARD PRODUCT WITH STRATEGICALLY PLACED SCORES filed 20 Apr. 2016; and is related to U.S. patent application Ser. No. 15/134,176, entitled SYSTEM AND METHOD FOR PRODUCING AN ARTICULATING BOARD PRODUCT HAVING A FACING WITH SCORE LINES IN REGISTER TO FLUTING filed 20 Apr. 2016; and is related to U.S. patent application Ser. No. 15/134,206, entitled SYSTEM AND METHOD FOR PRODUCING MULTI-LAYERED BOARD HAVING AT LEAST THREE MEDIUMS WITH AT LEAST TWO MEDIUMS BEING DIFFERENT filed 20 Apr. 2016, all of the foregoing applications are incorporated herein by reference in their entireties.

BACKGROUND

Modern paper-making techniques use paper machines at paper mills to produce rolls of paper that, in turn, can be used by board makers to produce board products (i.e., corrugated board). As a result, rolls of paper may be produced from machines that operate continuously. Modern paper machines typically produce paper from a number of substances including wood pulp that comprise wood fibers (although other fibers may also be used). These fibers tend to be elongated and suitable to be aligned next to one another. The fiber starts as a slurry that can be fed onto a moving screen from a head box of the paper machine. In modern paper machines, the fibers tend to align with each other and align with a direction in which the screen is moving. This alignment direction of underlying fibers is called the major direction of the paper and is in line with the machine direction. Thus, the major direction is often simply called the machine direction (MD) and the paper that is produced has an associated MD value.

When paper is used to make a board product, portions or layers of the board product may be corrugated. Conventional corrugating machines will corrugate the underlying paper product in the cross direction (CD) of the paper thereby failing to take advantage of the natural strength bias of the paper in the machine direction. Further, the greater natural strength qualities of paper in the machine direction are left unharnessed by cross corrugation techniques in board making solutions. Further yet, conventional corrugated medium includes flutes that take on a sinusoidal shape because of the shape of the protrusions in a conventional pair of corrugating rolls. As a result, companies that produce conventional board products remain entrenched in old production processes that limit the strength of the board product.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
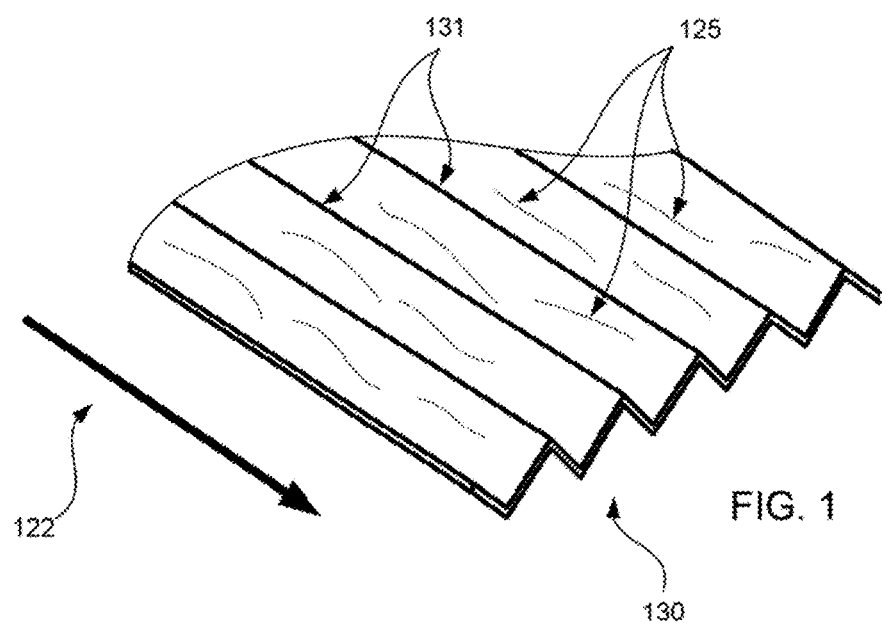
FIG. 1 is an isometric cutaway view of an embossed medium that may be part of one or more board products according to one or more embodiments of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for producing a board product made from paper products that have embossed medium (sometimes called embossed fluting) that features an improved structural profile. The improved structural profile may include a triangular flute pattern wherein each flute may exhibit a first linear leg support and a second linear leg support that each support a center apex structure. The apex may have a substantially flat portion that is configured to engage a facing. As such, the board product may further include one or more facings (sometimes called liners or walls) that are adhesively coupled to the embossed medium. Further, the apex of each "triangle" may also have a groove or channel for receiving an adhesive in a continuous and uniform manner.

When a board product is produced such that an embossed medium includes a flute profile with linear leg structures flanked by substantially flat apexes, the resulting board strength and overall structure is improved with respect to conventionally produced board having corrugated medium. Further, the embossed medium may be produced using a linear embossing process that takes advantage of the natural strength of the machine direction of the paper product. Additional permutations of the underlying concept of having a cross-corrugated medium and a linearly embossed medium in the same board product are possible, including disposing a facing between the corrugated medium and the embossed medium and having facings on one or both outer walls of the board product. These advantages and additional aspects of various embodiments of the subject matter disclosed herein are discussed below with respect to FIGS. 1-5.

Prior to discussing the various embodiments, a brief discussion about cross corrugating and linear embossing is presented. As has been briefly stated above, conventional board products include a conventionally produced corrugated medium (sometimes called a corrugated fluting), e.g., a cross-corrugated medium. A cross-corrugated medium has flutes formed perpendicular to most underlying fibers of the paper product. This results in flutes that are not aligned with the majority of underlying fibers and, therefore, do not take advantage of the natural strength of the MD value of the paper (when compared to the CD value). Such a failure to harness the MD value of the paper leads to loss of opportunity in the manufacturing of board products when specific board strength is to be realized. That is, it will necessarily take more paper (heavier paper, larger flutes, and the like) to realize the required board strength.

A linearly-embossed medium is different from a cross-corrugated medium in that the induced flutes are aligned with the MD value of the paper product. This results in flutes that are aligned with the majority of underlying fibers and, therefore, take advantage of the natural strength of the MD value of the paper (when compared to the CD value). Harnessing the MD value of the paper leads to efficiencies in the manufacturing of board products when specific board strength is to be realized. That is, it will necessarily take less paper (lighter paper, smaller flutes, and the like) to realize the required board strength. Aspects of making, producing, and using linearly embossed mediums are discussed in greater detail in U.S. patent application Ser. No. 15/077,250 entitled "SYSTEM AND METHOD FOR INDUCING FLUTING IN A PAPER PRODUCT BY EMBOSSING WITH RESPECT TO MACHINE DIRECTION" and filed on Mar. 22, 2016, which is incorporated herein by reference in its entirety and for all purposes. Thus, the aspects of linearly-embossed mediums will not be discussed further for brevity as the discussion now turns to FIGS. 1-5.

FIG. 1 is an isometric cutaway view of an embossed medium 130 that may be part of one or more board products according to one or more embodiments of the subject matter disclosed herein. This diagram shows an isometric view of a portion of an embossed medium 130 that may be formed from an embossing process. That is, flutes 131 are formed from passing the initial paper product through embossing rolls to form flutes using a linear-embossing technique such that the flutes 131 are formed congruent with a majority of underlying fibers 125 of the paper. The flutes 131 are also formed congruent with the machine direction 122. A linearly-embossed medium 130 harnesses the natural strength of the paper in the machine direction 122 as the flutes 131 are formed in the machine direction 122 of the paper (e.g., congruent with a majority the underlying fibers 125). Therefore, a linearly-embossed medium 130 does harness the natural strength of the paper in the machine direction 122. Such an embossed medium 130 may be a component/layer of a board product as discussed below with respect to FIG. 4.

Further, as is shown in FIG. 1, the flutes 131 may form a triangular pattern when viewed from a cutaway perspective. This flute pattern having a triangular repeating shape is referred to as a flute profile hereinafter. In the embodiments discussed in the remaining figures, the flute profile provides an improvement in structural integrity of the embossed medium when compared to a flute profile the exhibits a curvilinear or sinusoidal flute profile. Such a curvilinear or sinusoidal flute profile is prevalent in conventional cross-corrugated mediums. Therefore, the triangular flute profile as shown in FIG. 1 is also superior to corrugated mediums with respect to medium strength and structural integrity. Various reasons why this flute profile and other similar flute profile exhibit superior strength and structural integrity are presented below with respect to FIGS. 2-3.

Figure 2:
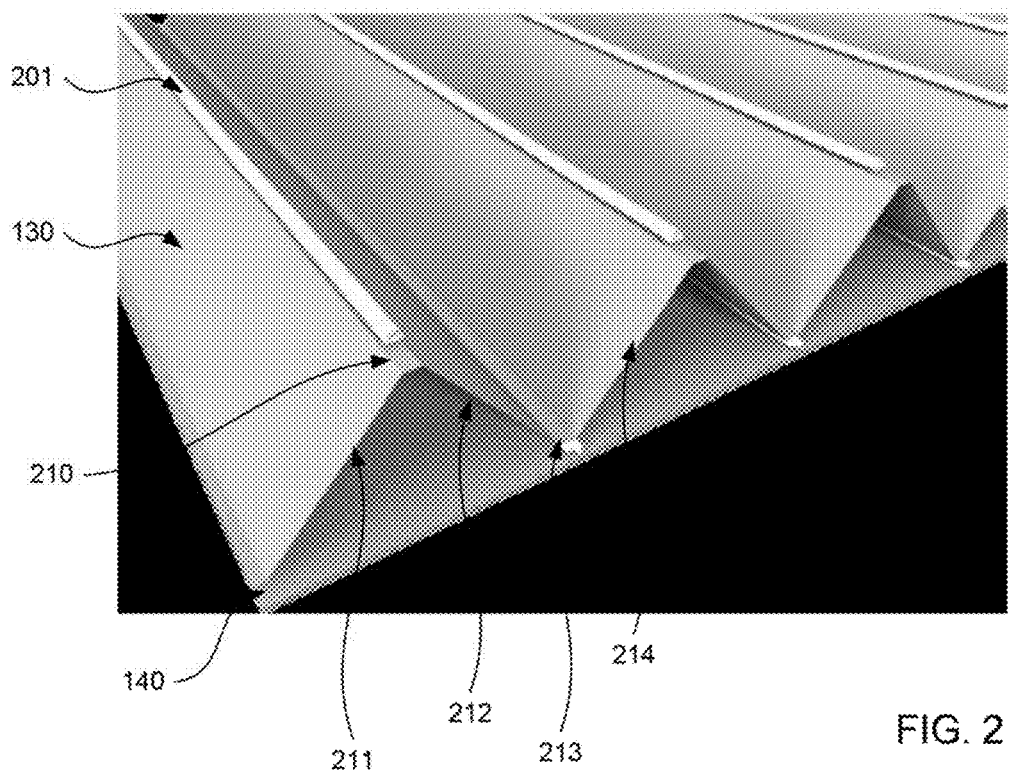
FIG. 2 is an isometric cutaway view of an embossed medium having an adhesive applied to tips of medium support structure that may be part of one or more board products according to one or more embodiments of the subject matter disclosed herein.

FIG. 2 is an isometric cutaway view of an embossed medium 130 having an adhesive 201 applied to the apex structure of the medium support structure that may be part of one or more board products according to one or more embodiments of the subject matter disclosed herein. In FIG. 2, a closer look at the embossed medium shows a series of flutes that form an isosceles triangle flute profile. The flute profile may comprise a series of support structures that each include three portions. In this example, the three portions are a first leg support structure 211, a second leg support structure 212, and an apex structure 210. As shown, the apex structure 210 is disposed between the first and second leg support structures 211 and 212. In this example support structure then, each support structure may have an apex facing up (although up is an arbitrary direction simply shown by virtue of the illustration).

By the same token, a second series of support structures may also each include three portions, but from the downward facing perspective. In this respect, the leg support structure 212 also forms a leg support structure for a triangle facing downward. Thus, the three portions are a first leg support structure 214, a second leg support structure 212, and an apex structure 213 disposed between the first and second leg support structures 214 and 212. Note that the second leg structure 212 is the same second leg support structure with respect to the upward facing apex 210 and the downward facing apex 213. The flute profile can then be thought of as series of alternating upward 210 and downward 213 facing apexes with alternating linear leg support structures (e.g., 211, 212, and 214) disposed there between.

Each apex 210 and 213 may be formed to be substantially flat so as to provide a uniform surface to receive the adhesive 201 from a machine for locating an apex and applying a continuous line of adhesive to each apex. Then, the embossed medium 130 may be affixed to a facing 140 at the apexes that have adhesive 201 at the ready. In other embodiments, each apex 210 and 213 may have a groove for facilitating the receiving of the adhesive. With a groove, the adhesive will tend to remain in place while the embossed medium 130 is moving through a board-making machine. Such a grooved apex embodiment is discussed below with respect to FIG. 3C.

The embodiments as discussed with respect to FIGS. 1-2 have an embossed medium 130 that exhibits an isosceles triangular flute profile having superior strength and improved support structure. One reason that this embodiment provides superior strength is that the leg support structures 211, 212, and 214 are linear. That is, the leg support structures are not curved and therefore tend to remain fixed and rigid when various forces are applied from various directions. In a sinusoidal corrugated medium, the "legs" are more like a continuous curve of a sinusoidal pattern. Thus, the "apex" of each flute may be the top side of the sinusoidal curve that exhibits a curved, smooth transition to any portion of the medium that eventually forms a quasi-flat apex. Because of the curved, smooth transition on either side of the apex of conventional corrugated medium, the apex may translate forward and backward in an undesired manner. With linear leg support structures 211, 212, and 214, a more defined structure is provided that resists unpredictable movement and failure points.

Further, as the well-known maxim goes, the shortest distance between two points is a straight line. As applied here, the shortest distance between each top-side facing apex and each bottom side facing apex is a linear leg support structure. Thus, having a triangular flute profile necessarily uses less overall paper to produce the embossed medium (as compared to a sinusoidal corrugated medium). Other embodiments may include different shapes for a flute profile including saw-tooth, trapezoidal, or any manner of a geometric shape that exhibits linear leg support structures flanked by alternating top-side and bottom-side apexes. Three such embodiments are shown in FIGS. 3A-C and discussed next.

Figures 3A, 3B, 3C:
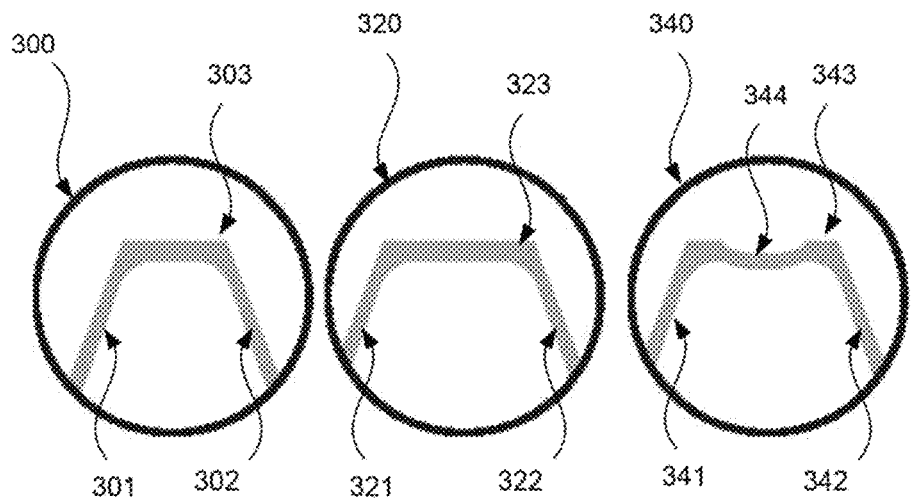
FIGS. 3A-C are profile views of various flute profiles of medium having improved structure according to embodiments of the subject matter disclosed herein.

FIGS. 3A-C are profile views of various flute profiles of medium having improved structure according to embodiments of the subject matter disclosed herein. In FIG. 3A, a first isosceles triangle flute profile 300 is shown. This flute profile 300 is also shown in FIGS. 1 and 2, but this view provides a cross-section view of the actual flute profile. In this embodiment, each flute includes a first linear leg support structure 301 and a second linear leg support structure 302 that are each coupled to one apex 303 disposed there between. The apex 303 is disposed substantially flat and in a plane that is parallel to an eventual facing that may be coupled (via adhesive, or other means—not shown). Further, the width of the apex 303 in this embodiment is approximately one tenth of the length of each linear leg support structure 301 and 302. Thus, this embodiment may be referred to as a narrow apex flute profile 300.

In this embodiment, the angle of each leg 301 and 302 with respect to each apex 303 may be approximately 60 degrees. However, any number of leg angles may be realized. Thus, the first linear leg structure 301 and the second linear leg structure 302 may be affixed with respect to the apex 303 plane at an angle between approximately 30 degrees and 60 degrees.

In FIG. 3B, a second isosceles triangle flute profile 320 is shown. This flute profile 320 view provides a cross-section view of the actual flute profile exhibiting a first linear leg support structure 321 and a second linear leg support structure 322 that are each coupled to one apex 323 disposed there between. Further, the apex 323 is disposed substantially flat and in a plane that is parallel to an eventual facing that may be coupled. Different from FIG. 3A, the width of the apex 323 in this embodiment is approximately one fifth of the length of each linear leg support structure 321 and 322. Thus, this embodiment may be referred to as a wide apex flute profile 320.

In FIG. 3C, a third isosceles triangle flute profile 340 is shown. This flute profile 340 view provides a cross-section view a flute profile exhibiting a first linear leg support structure 341 and a second linear leg support structure 342 that are each coupled to one apex 343 disposed there between. As before, the apex 343 is disposed substantially flat and in a plane that is parallel to an eventual facing that may be coupled. Different from FIGS. 3A and 3B, the apex 343 includes a groove or channel for receiving an adhesive prior to being coupled to a facing (not shown). In this embodiment, the width of the apex 343 is approximately one fifth of the length of each linear leg support structure 321 and 342. Thus, this embodiment may be referred to as a wide grooved apex flute profile 340. Other flute profiles are contemplated but not discussed further for brevity.

Figure 4:
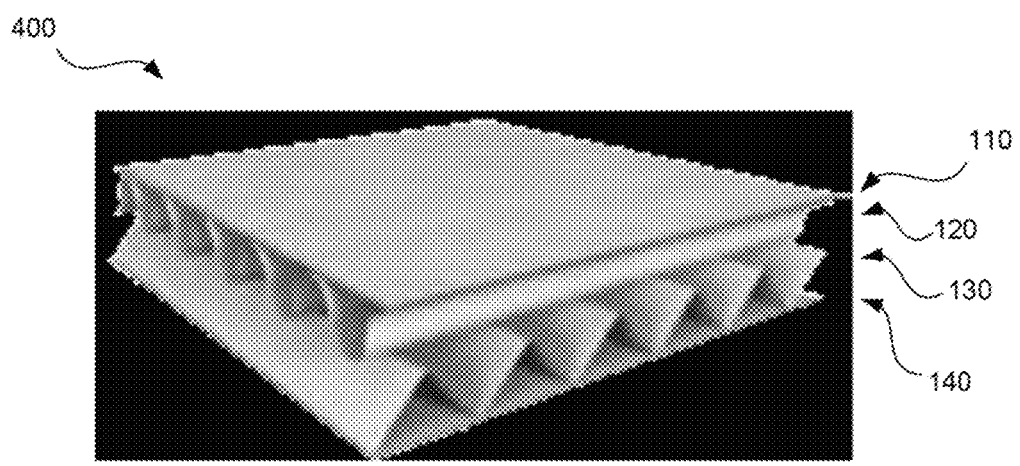
FIG. 4 is an isometric cutaway views of a board product having the embossed medium of FIG. 1 according to an embodiment of the subject matter disclosed herein.

FIG. 4 is an isometric cutaway view of a board product 400 having an embossed medium 130 with improved flute structure according to an embodiment of the subject matter disclosed herein. In this embodiment, the board product includes four layers: a first facing 110, a corrugated medium 120, an embossed medium 130, and a second facing 140. As is shown, the first facing 110 may form a top-side outer wall (although the top/bottom direction reference to alignment of the board product 100 is arbitrary) that is coupled to one side of the corrugated medium 120. The coupling may be through an adhesive applied to the apex of each flute on the top-side of the corrugated medium 120 such that the facing 110 is glued to the corrugated medium 120 where adhesive is applied. In other embodiments, glue may be applied to the entirety of the facing 110 prior to being coupled to the corrugated medium 120.

Likewise, a second facing 140 may form a bottom-side outer wall (again, the top/bottom direction reference is arbitrary) that is coupled to one side of the embossed medium 130. The coupling may be through an adhesive applied to the apex of each flute on the bottom-side of the embossed medium 130 such that the facing 140 is glued to the embossed medium 140 where adhesive is applied. In other embodiments, glue may be applied to the entirety of the facing 140 prior to being coupled to the embossed medium 130.

Further, the corrugated medium 120 and the embossed medium 130 may also be glued to each other using adhesive. Because the flutes of the corrugated medium 120 are aligned in the cross direction and the flutes of the embossed medium 130 are aligned in the machine direction, the contact points between these two mediums will be at the crossings of the apexes of the respective flutes. In this manner, the corrugated medium 120 and the embossed medium 130 are affixed with respect to one another because of the adhesive holding one medium directly to the other.

When all four layers are assembled and affixed, the resultant board product 400 is stronger than conventional board product because the linearly embossed medium 130 includes a flute profile that exhibits superior strength because of the linear leg structures of each flute. Further, adhesive may be continuously and uniformly applied to each apex in a predictable and repeatable manner with greater precision as portions of the adhesive will not spill over to the legs as may be the case with sinusoidal apexes having no flat receiving area. As shown in FIG. 4, the board product 400 includes a corrugated medium 120. In other embodiments, the corrugated medium 120 may not be present such that the top-side facing 110 is glued to each top-side apex of the embossed medium and the bottom-side facing 140 is glued to each bottom side apex of the embossed medium 130. Additional aspects of the board product 400 of FIG. 4 are discussed next with respect to the machine of FIG. 5.

Figure 5:
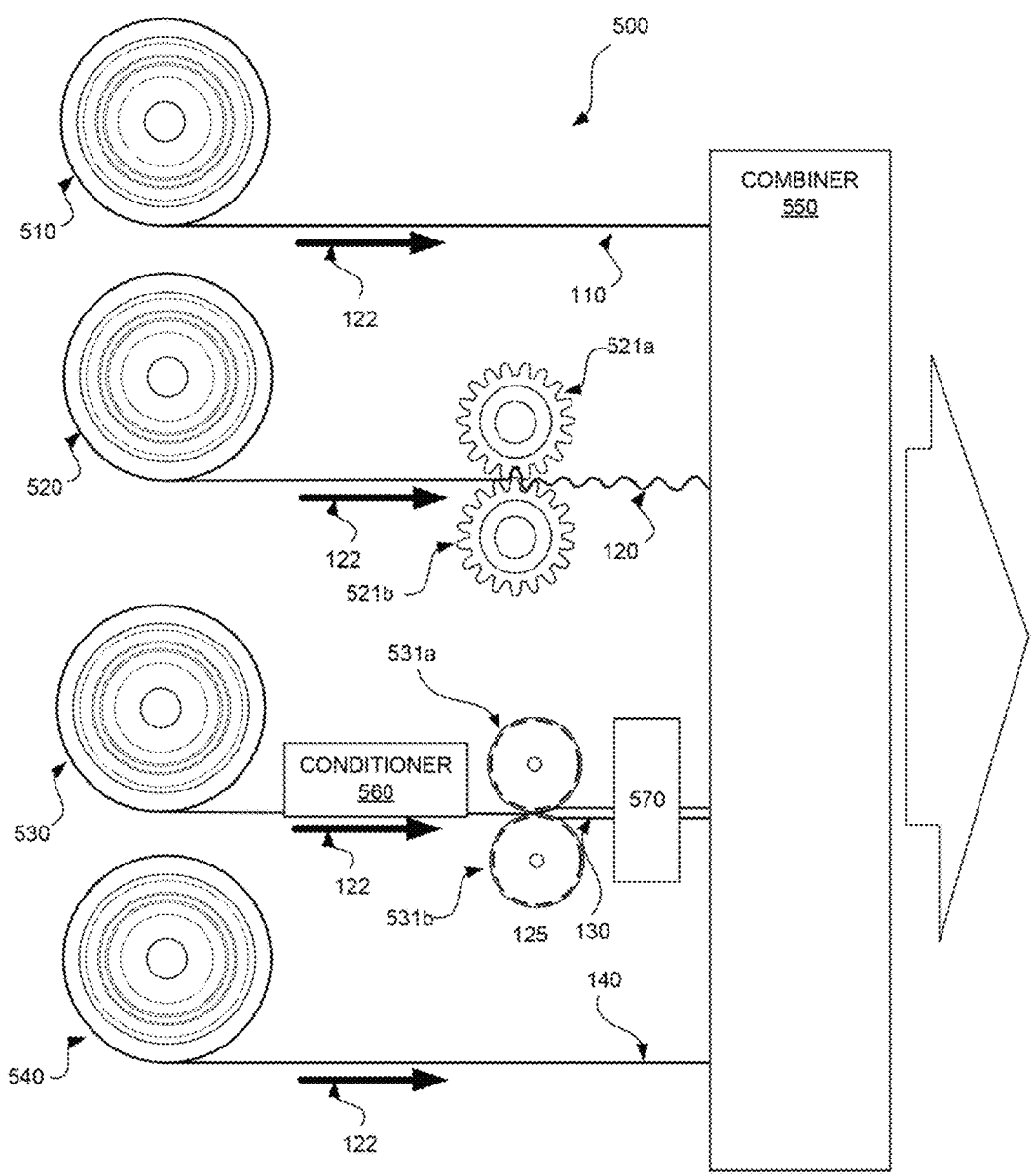
FIG. 5 is a diagram of aspects of a machine configured to produce the board product of FIG. 4 according to an embodiment of the subject matter disclosed herein.

FIG. 5 is a diagram of aspects of a machine 500 configured to produce the board product of FIG. 4 according to an embodiment of the subject matter disclosed herein. In this embodiment, the machine includes four feed rolls 510, 520, 530, and 540 of paper that are used to produce a board product. These feed rolls include a first facing feed roll 510, a corrugated medium feed roll 520, an embossed medium feed roll 530, and a second facing feed roll 540. Note that the paper that is wound on the corrugated medium feed roll 520 is prior to corrugating and the paper that is wound on the embossed medium feed roll 530 is prior to embossing. The weights and composition of the paper for each respective feed roll may be different and designed specifically for the respective purpose.

The paper from each roll may be unwound from each respective roll and fed toward a combiner 550 that is configured to combine the various layers of paper together to form a resultant board product. Prior to entering the combiner 550, at least some of the paper from the feed rolls may be passed through a stage for forming the paper into a medium. As used herein and in the industry, a medium may refer to a paper product that has been formed into paper having flutes. Thus, the corrugated medium feed roll 520 may feed paper into first and second corrugating rolls 521*a* and 521*b* that are aligned with respect to each other. As the paper exits the corrugating stage (e.g., corrugating rolls 521*a* and 521*b*), it becomes the corrugated medium 120. The corrugated medium 120 is then fed into the combiner 550 to be combined with other materials. Similarly, the embossed medium feed roll 530 may feed paper into first and second embossing rolls 531*a* and 531*b* that are aligned with respect to each other. As the paper exits the embossing stage (e.g., embossing rolls 531*a* and 531*b*), it becomes the embossed medium 130 as discussed above with respect to FIG. 1. The embossed medium 130 is then fed into the combiner 550 to be combined with other materials.

Further, the embossed medium paper feed 530 may be first fed into a conditioner 560 that may condition the paper prior to embossing. Such conditioning may include wetting the paper, heating the paper, cooling the paper, applying chemicals to the paper and various other forms of changing the underlying condition of the paper to be better prepared for embossing. In this sense, one may think of the conditioning stage as "relaxing" underlying fibers of the paper such that the paper may be in a more compliant state to be manipulated easier so as to avoid tearing and ripping. Such condition may remove or modify inherent stiffness in the paper and reduce the degree of possible fiber damage that will occur in the stretching process during embossing. In one embodiment, the conditioner may immerse (entirely or partially) the paper web in process in a liquid (e.g., water, recoverable solvent, and the like). The liquid may be heated or not so as to achieve the desired paper condition of compliance/plasticity.

Once passed through the embossing rolls 531*a* and 531*b*, the embossed medium 130 may be passed to an applicator 570 for applying adhesive to the newly formed apexes. The applicator may include a device for identifying the locations of each apex and then aligning a series of adhesive dispensers with the identified apexes. In other embodiments, adhesive may be transferred to the flute tips with a glue roll or rolls where the paper contacts a glue film and adheres to the flute tips. In this manner, adhesive may be applied with precision in a continuous and uniform manner. Then, the first facing 110, the corrugated medium 120, the embossed medium 130, and the second facing 140 are combined in the combiner 550 using various techniques such as adhesion, curing, wetting, drying, heating, and chemical treatment. The resultant board product 400 features at least one cross-corrugated medium 120 and at least one linearly-embossed medium 130 wherein the linearly embossed medium includes a flute profile with improved structure.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A board product, comprising:
   a paper medium having a plurality of flutes, wherein at least a set of the plurality of flutes each comprise a first linear leg support structure having a first length, a second linear leg support structure having the first length and an apex structure having a second length approximately one tenth of the first length; and
   a paper facing coupled to the apex structure.

2. The board product of claim 1, further comprising a second facing affixed with respect to the paper medium.

3. The board product of claim 1, further comprising a second paper medium affixed with respect to the paper facing.

4. The board product of claim 1, wherein the first linear leg structure and the second linear leg structure are affixed with respect to the paper facing at an angle between approximately 30 degrees and 60 degrees.

5. The board product of claim 1, wherein each apex structure comprises a flat portion parallel to the paper facing.

6. The board product of claim 1, wherein each apex structure further comprises a flat portion having a groove configured to channel an adhesive for coupling each apex structure to the paper facing.

7. The board product of claim 1, further comprising a continuous adhesive line coupled between each apex structure and the paper facing.

8. The board product of claim 1, wherein the plurality of flutes further comprise:
   a first plurality of flutes each having an apex structure coupled to the paper facing such that the paper facing is affixed to the paper medium on a first side; and
   a second plurality of flutes each having an apex structure coupled to a second paper facing such that the second paper facing is affixed to the paper medium on a side opposite the first side.

* * * * *